Oct. 7, 1958 R. W. QUIRK 2,855,196

TAPE STORAGE SYSTEMS

Filed Aug. 3, 1955 2 Sheets-Sheet 1

ROBERT W. QUIRK, INVENTOR

BY Henry Heyman

ATTORNEY

Oct. 7, 1958

R. W. QUIRK 2,855,196

TAPE STORAGE SYSTEMS

Filed Aug. 3, 1955

2 Sheets-Sheet 2

ROBERT W. QUIRK,
INVENTOR

BY Henry Heyman
ATTORNEY

United States Patent Office 2,855,196

Patented Oct. 7, 1958

2,855,196

TAPE STORAGE SYSTEMS

Robert W. Quirk, Los Angeles, Calif., assignor to Hughes Aircraft Company, Culver City, Calif., a corporation of Delaware Application August 3, 1955, Serial No. 526,286

6 Claims. (Cl. 270—79)

This invention relates to tape storage systems and more particularly to a low-inertia system for storing large quantities of recording tape for immediate and rapid access.

In tape recording and reproducing apparatus, the recording tape must be stored preparatory to being moved past a transducer head by the tape drive mechanism of the apparatus and also must be stored as it is played out by the mechanism. Where relatively short lengths of tape are used or where the recording tape is moved past the transducer head at a comparatively slow velocity, in the order of 15 inches per second, the tape may be satisfactorily stored on reels. Difficulty is experienced, however, in utilizing storage reels in tape recording and reproducing apparatus employing long recording tapes which are moved at a high velocity due to the high inertia of the tape reels. In order to avoid breaking the tape as the tape is accelerated from rest to its predetermined running velocity, the tape must be gradually accelerated during relatively long acceleration periods, in order to overcome the inertia of the tape storage reels without subjecting the tape to undue strain.

Tape recording and reproducing apparatus utilized in conjunction with a digital computer requires a long recording tape in order to provide sufficient storage for recording and reproducing the large volume of data normally handled by a computer in the solution of problems. In addition, the recording tape must be moved past the transducer of the apparatus at an extremely high velocity in order to record data produced by the computer and in order to reproduce data previously recorded from the computer at a speed commensurate with the speed of operation of the computer. It is not uncommon, for example, to utilize tape recording and reproducing apparatus employing a recording tape in excess of 2,000 feet in length which is accelerated from rest to a predetermined constant velocity of approximately 75 inches per second to move past a transducer during an acceleration period of as little as five milliseconds. Such tape recording and reproducing apparatus require a tape storage system which is characterized by a minimum of inertia in order to avoid breaking of the tape during acceleration periods and in order to avoid overshooting during de-acceleration periods. Reel tape storage systems are wholly inadequate to meet the above rigid requirements due to the high inertia of the storage reels and the relatively heavy rolls of tape stored thereon.

In an attempt to provide a tape storage system suitable for operation in a tape recording and reproducing apparatus adapted for operation with a digital computer, the prior art has utilized a tape tank storage system wherein the tape is stored in freely formed loose folds within a source tank having an internal width slightly greater than the width of the tape to be stored. As the tape is played out by the tape drive mechanism, it is allowed to fall in freely forming loops or random folds in a second, similarly constructed tape receiving tank. Tape tank storage systems of the above class are fully described and illustrated in an article entitled "Input-Output Devices Used With Seac" by James L. Pike in "Review of Input and Output Equipment Used in Computing Systems," published by AIEE, March 1953, in New York.

Although the tape tank system as above described has been used for storing relatively short lengths of tape, this storage system has certain inherent disadvantages, among which are poor volumetric efficiency, relatively high inertia, and a tendency to crease the tape. Since the tape is allowed to fall in freely forming folds, commonly used paper and plastic-back tapes will form relatively large loops for each fold. Consequently, a roll of the tape occupies considerably more space when unrolled and stored in a tape storage tank than it previously occupied when rolled. As a result, the volumetric efficiency of the tape tank system is considerably less than that of the reel storage system.

Each time the tape is accelerated from rest to full running velocity, the inertia of a length of tape equal to the distance from the tape drive mechanism to the uppermost fold of the tape in the storage tank must be overcome. This inertia becomes progressively larger as each fold of the storage tape is removed and reaches a maximum as the lowermost folds are removed from the tank.

Where lengths of tape in excess of a few hundred feet are utilized with this tape tank system, the lower folds of tape resting on the floor of the tape tank may be permanently creased by the combined weight of the upper folds of the tape. Since, as above mentioned, it is often desirable to use tapes in excess of 2,000 feet in length in tape recording and reproducing apparatus utilized in conjunction with digital computers, the lower loops of the tape in a tank storage system are usually rapidly creased within a short period of time by the weight of the tape above them. In conventional recording tapes, such as plastic back oxide-coated magnetic tape, these creases, once formed, are permanent in nature and cause the tape to be held away from the head at the light pressures preferably used for contact with the transducer head during recording or reproducing. More specifically, these creases cause the distance between the head and the recording tape to be increased at the points at which the tape is creased thus resulting in a smaller than normal signal or a complete absence of a signal at these points. If the tape is held against the head with sufficient force to overcome the effect of the creases, increased wear on the tape and the head is encountered which is especially detrimental at the high velocities utilized for tape recording and reproducing equipment of digital computers.

In the past, attempts have been made to avoid creasing the tape in tape tank storage systems by increasing the width of the storage tank, thus reducing the number of folds required for storing the entire length of the tape. In this manner, the lowermost folds are subjected to proportionately less creasing pressure. In order to afford safe relief from creasing, however, the tank must be enlarged to disproportionate dimensions resulting in a tank impractical because of its size. Further, a limit is reached beyond which the tape will not form freely forming folds sufficiently long to cover the width of the tank. In addition the volumetric efficiency of the storage system is reduced to a point wherein the storage system becomes no longer practical.

A further attempt of the prior art to avoid creasing the bottom folds of tape in a tape tank storage system is fully described in an article entitled "Operational Experience with Seac" by Ernest F. Ainsworth in "The Review of Input and Output Equipment Used in Computing Systems," published by AIEE, March 1953, in New York. In accordance with this system, a tape tank having projections originating from alternate sides of the tank to a distance somewhat short of the mid-point of the tank is utilized to distribute the folds of the stored tape into separate groups, each group being supported by one of the projections. In this manner, the lowermost folds on each projection are subjected to the weight of the remaining folds on the projection only, no fold being pressed by the entire weight of the remaining stored tape. The tank provided with projections, however, as above described, has the disadvantage of increasing the inertia of the tape storage system since the tape must be pulled past each projection through the space between adjacent projections, or the projections and the tank. In addition, this system will still cause creasing of the tape in due time, in that the bottom fold on each projection must support the weight of the tape represented by the remaining folds between that projection and the next. Further, the volumetric efficiency of the system is obviously poor.

It is therefore an object of the present invention to provide a low-inertia tape storage system for storing large quantities of tape for immediate and rapid access.

It is a further object of the present invention to provide a tape storage system of the class referred to which does not cause creasing of the tape stored.

A still further object of the present invention is to provide a tape storage system of the above class which has a high volumetric efficiency.

Another object of the present invention is to provide a storage system of the type referred to which is suitable for efficiently and reliably storing lengths of tape in excess of 2,000 feet.

It is also an object of the present invention to provide a tape storage system of the above class which is suitable for operation in the tape recording and reproducing apparatus of a digital computer.

In accordance with the basic concepts of the present invention, a flexible ribbon, such as a magnetic tape, is stored by supporting the entire length of the tape in draped loops over a tape support. To accomplish this, the tape is draped over the support by guiding the tape so as to permit it to fall on alternate sides of the support for predetermined intervals of time as it is played out by an associated tape drive mechanism. In this manner, the tape is made to form folds of predetermined length over the support until the entire length of the tape is supported by the suppoet in freely hanging folds. The length of each fold is determined by the velocity at which the tape is played out by the tape drive mechanism and the length of time that the tape is permitted to fall over each side of the support.

Each fold of the tape looped or draped over the tape support may be of equal length and thus extend downward to the same level. In this case the supported draped loops of tape will bell out at this level because the loop formed at the folding point of each fold is wider than the thickness of the corresponding sections of the tape forming the loop. In order to further increase the volumetric efficiency of the tape storage system of the present invention, the tape may be draped or looped over the tape support in folds of varying length in a manner to produce two or more folding-loop levels, thereby reducing the bell-out of the supported tape. This may be accomplished by merely varying appropriately the length of time during which the tape is permitted to fall on alternate sides of the tape support as it is played out by the tape drive mechanism.

For a better understanding of the invention, together with other and further objects thereof, reference is made to the following description, taken in connection with the accompanying drawings, and its scope will be pointed out in the appended claims.

Figure 1:
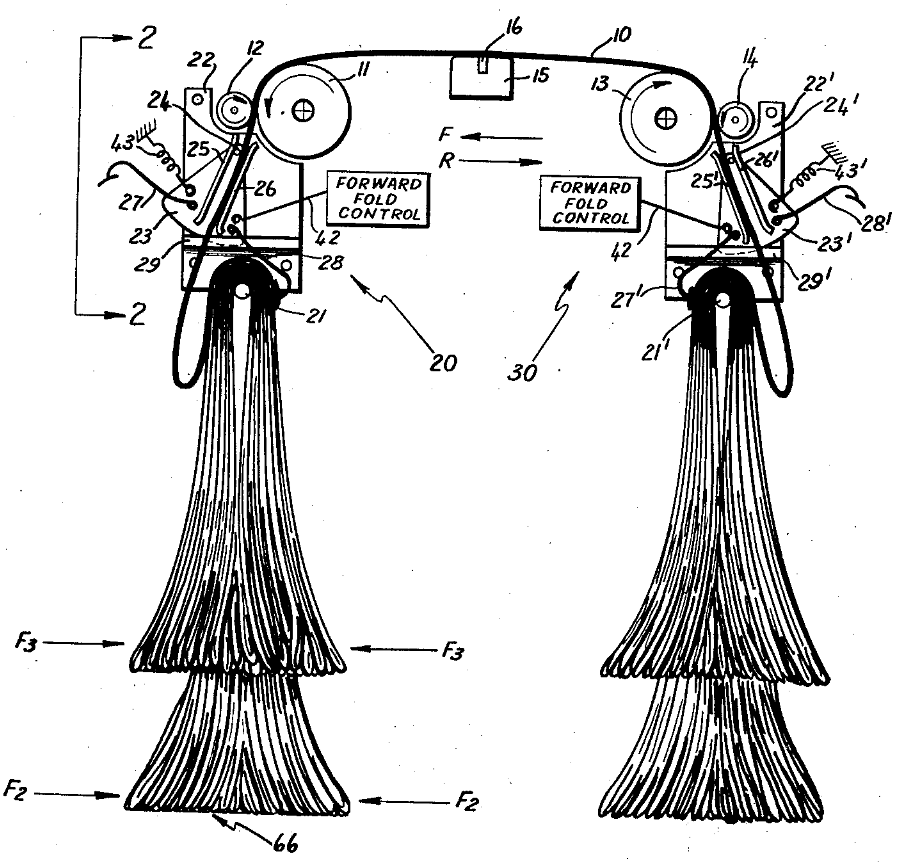
Fig. 1 is a diagrammatic elevational view of an embodiment of the tape storage system of the present invention shown in conjunction with a two-direction tape drive mechanism of a tape recording and reproducing apparatus.

Reference is now made to the drawings wherein like parts are identified throughout by like reference numerals. Referring specifically to Fig. 1, an embodiment of the tape storage system of the present invention is illustrated in conjunction with a two-direction high speed tape drive mechanism comprising a pair of forward drive and jam rollers 11 and 12 and a pair of reverse drive and jam rollers 13 and 14 for accelerating a magnetic tape 10 in a forward and reverse direction, respectively, as indicated by arrows F and R past a transducer housing 15 containing a transducer head 16. Tape 10 is caused to be moved in the forward direction by pressing forward jam roller 12 against continuously rotated forward drive roller 11, and is moved in the reverse direction by causing reverse jam roller 14 to be pressed against continuously rotated reverse drive roller 13.

As indicated in the figure, the tape storage system of the present invention comprises a forward tape storage unit generally designated as 20, and a reverse storage unit generally designated as 30. As tape 10 is played out by the forward acceleration rollers 11, 12, the tape is received and stored by the forward storage unit 20, and as the tape is played out by the reverse acceleration rollers 13, 14, it is received and stored by the reverse storage unit 30.

Figure 2:
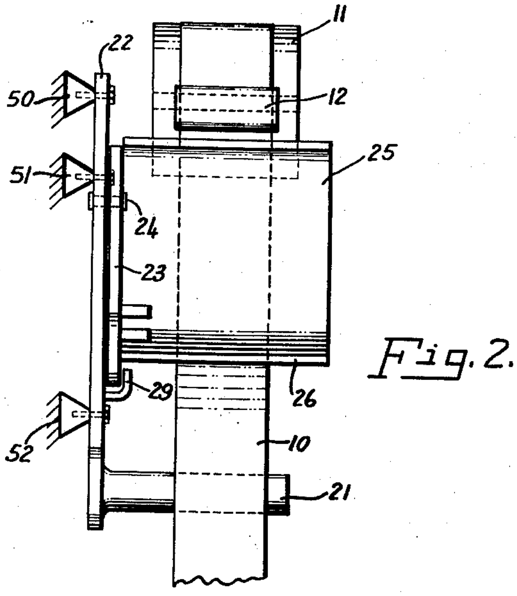
Fig. 2 is a side view of the forward tape storage unit of Fig. 1 viewed from line 2—2 of Fig. 1.

Forward tape storage unit 20 includes a forward support plate 22 shown also in Fig. 2 upon which is mounted a forward tape guide plate 23 and a forward tape support rod 21. Forward guide plate 23 includes a pair of forward tape guides 25 and 26 which are affixed thereto and between which tape 10 is guided as it is played out by the forward acceleration rollers 11, 12. Guide plate 23 further includes a pair of forward pressure stops 27 and 28, of the general form illustrated, secured thereto. Guide plate 23 is hinged to support plate 22 by pivot pin 24 in a manner to permit guide plate 23 to swing on pin 24 in a channel formed by a forward guide lug 29.

In accordance with the concepts of the present invention, tape 10 is stored in the forward tape storage unit 20 by supporting the tape in draped loops of predetermined lengths over support rod 21 in a manner as generally indicated in the figure. This is accomplished by guiding tape 10 so as to permit the tape to fall alternately to the right-hand and left-hand sides, respectively, of support rod 21 as it is played out by acceleration rollers 11, 12. This is achieved by successively positioning tape guide plate 23 to the right and left, respectively, as viewed in Fig. 1.

By alternately positioning guide plate 23 in its left-hand and right-hand positions for predetermined time intervals, tape 10 is caused to be successively folded over tape support rod 21 in a manner as generally indicated in the figure. In addition to limiting the clockwise and counter-clockwise swing of plate 23, stops 27 and 28 prevent the tape supported on support rod 21 from slipping, as each fold is produced, by pressing the supported tape against the support rod.

A continuous clockwise torque is applied to guide plate 23 about pivot pin 24 by an anchored spring 43 this torque being sufficient to cause plate 23 to assume its left-hand position wherein forward pressure stop 28 presses the tape against tape support rod 21, as illustrated.

Guide plate 23 is selectively subjected to a counter-clockwise torque about pivot pin 24 by a forward fold control, schematically indicated as 41, which is connected to plate 23 by a forward control arm 42. This counter-clockwise torque is sufficiently great to overcome the clockwise torque developed by spring 43, thus causing plate 23 to assume its right-hand position wherein forward pressure stop 27 presses the tape against support rod 21. Guide plate 24 may be selectively positioned in either its left-hand or its right-hand position, therefore, by means of forward fold control 41.

It will be apparent that the length of each fold will be determined by the velocity at which tape 10 is played out by forward acceleration rollers 11, 12 and the length of time during which guide plate 23 is allowed to remain in each of its positions. However, as is usually the case, tape 10 is played out by forward acceleration rollers 11, 12 at a constant velocity. If pltae 23 is made to assume each of its two alternate positions for equal intervals of time, therefore, the folded mass of tape stored on support rod 21 will tend to bell out at a horizontal plane intersecting each loop or extremity of each fold as indicated generally in the figure by arrows $F_2$.

Since the tape supported on support rod 21 will tend to bell out at the loops of the tape, only the innermost folds of tape, shown at 66, will hang vertically. The remaining outer folds, however, are inclined from the vertical. The innermost folds 66, therefore, are subjected to lateral forces in the direction of arrows $F_2$. These forces are equal to the horizontal components of the weight of the outer inclined folds of the tape. It will be apparent to those skilled in the art that the magnitudes of these forces are extremely small due to the relatively small angles, the folds make with the vertical and the relatively small weight of the tape. This is in contrast to the tape-tank storage system previously discussed wherein the lower folds of tape must support the entire weight of the remaining tape stored.

It may be desirable, however, to increase the volumetric efficiency of the storage system of the present invention by reducing the belling-out of the supported tape. This is accomplished by staggering the lengths of the folds to produce two or more folding levels. For example, forward tape storage unit 20 of Fig. 1 is adapted to produce two folding levels, indicated in the figure by arrows $F_2$ and $F_3$. To accomplish this, guide plate 23 is positioned, by fold control 41, successively in its two positions for a long interval for producing folds extending to level $F_2$, and then for a shorter interval of time for producing folds extending to level $F_3$. In this manner an equal number of folds extending to each level are produced. It will become apparent from the ensuing description that folds of more than two folding lengths may be formed over tape support rod 21, thus further reducing the bell-out of the supported tape and thereby further increasing the volumetric efficiency of the storage unit.

Reverse tape storage unit 30 is identical in structure and operation to forward tape storage unit 20. The structural parts or elements of reverse storage unit 30 accordingly are identified with primed reference numbers corresponding to the reference numbers, without primes, utilized for identifying the similar parts of forward tape storage unit 20. Since tape storage units 20 and 30 are identical, the remainder of this description is limited to a more detailed discussing of the forward tape storage unit 20, it being understood that the following discussion applies with equal force to forward tape storage unit 30.

Figure 3:
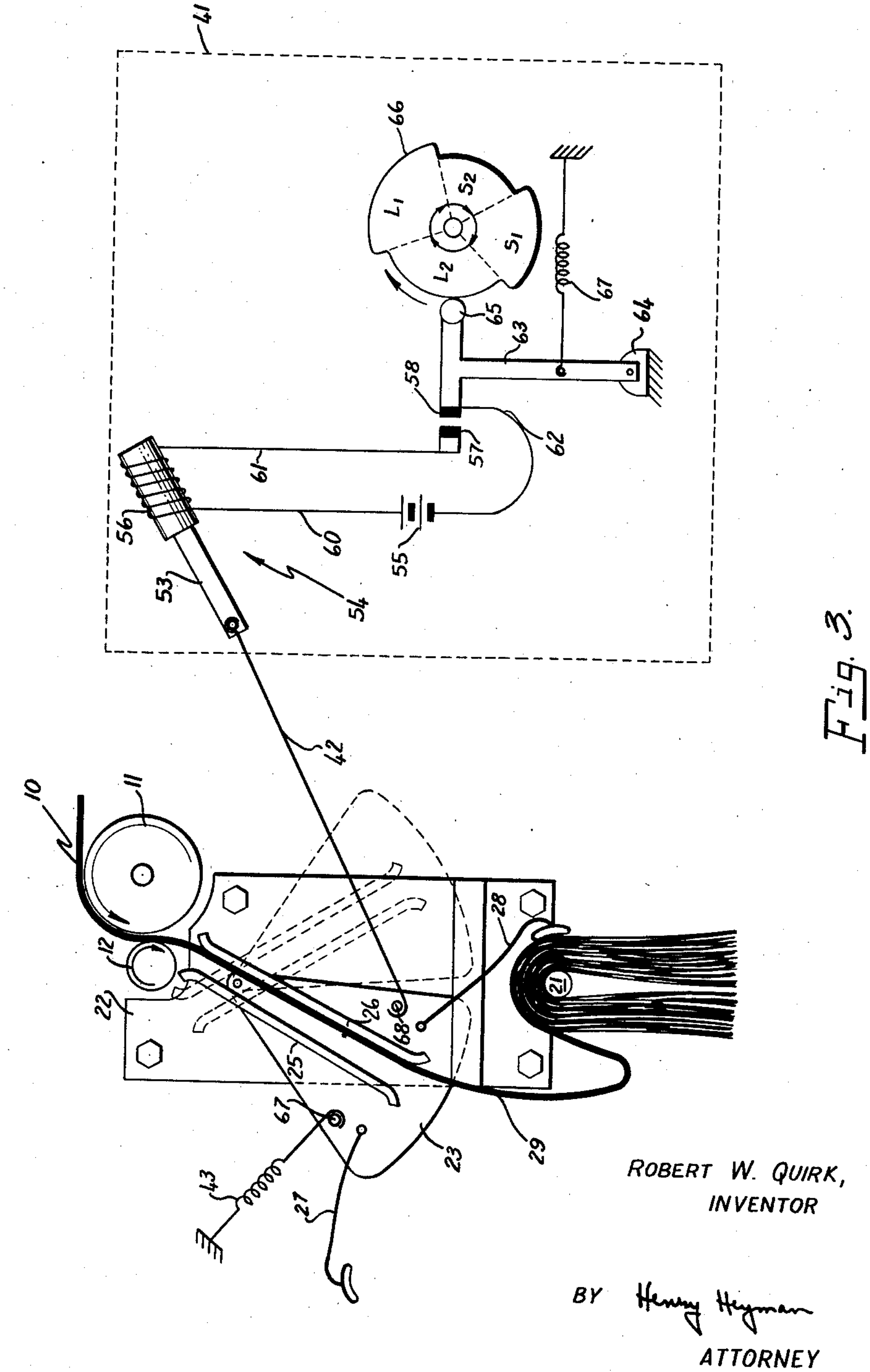
Fig. 3 is an elevational view of the forward tape storage unit of Fig. 1 which further includes a detailed schematic diagram of the forward fold control of the system of Fig. 1.

The structure and operation of the forward fold control 41 of Fig. 1, which controls the positioning of guide plate 23, is illustrated in detail in Fig. 3 wherein the forward fold control 41 is indicated by dotted lines. As illustrated, armature 53 of an electromagnetic solenoid 54 is linked to plate 23 by control arm 42. As previously explained, this is accomplished in a manner to cause guide plate 23 to assume its right-hand position when solenoid 54 is energized, and assume its left-hand position when the solenoid is de-energized. In the figure, plate 23 is shown in its left-hand position by solid lines and is illustrated in its right-hand position by broken lines. Solenoid 54 is illustrated, therefore, in its de-energized state wherein armature 53 is fully extended as a result of the force exerted on plate 23 by return spring 43.

Solenoid 54 is selectively energized by applying a potential developed by a battery 55 to the winding 56 of the solenoid through a stationary contact 57 and a movable contact 58. To this end, leads 60, 61 of winding 56 are respectively connected to one terminal of battery 55 and stationary contact 57; the other terminal of battery 55 being connected, to movable contact 58 by a pig-tail lead.

Movable contact 58 is affixed to the left-hand extremity of the cross-arm of a T-shaped rocker arm 63 which is pivoted at its base about a fixed fulcrum ear 64. At the opposite extremity of the cross-arm is mounted a freely rotatable cam follower 65. Rocker arm 63 is subject to a constant clockwise torque about its pivot by an anchor spring 67 connected thereto thereby causing cam follower 65 to firmly press against the outer periphery of a cam 66. Cam 66 is continuously rotated at a constant angular velocity in a clockwise direction by a driving means, not shown.

The circumference of rotating cam 66 is divided into four sectors $L_1$, $L_2$, $S_1$, and $S_2$; sections $L_1$ and $S_1$ having a first radius, and sections $L_2$ and $S_2$ having a second radius. The first radius is sufficiently large to cause rocker arm 63 to tilt toward the left sufficiently to close contacts 57, 58, whereas the second radius permits the rocker arm to assume a vertical position, as shown in Fig. 3, permitting the contacts to remain open. Thus, contacts 57, 58 remain open so long as cam follower 65 is in contact with sections $L_2$ and $S_2$ of rotating cam 66, and remain closed when the cam follower is in contact with sections $L_1$ and $S_1$ of the cam.

From the preceding discussion it will now be apparent that guide plate 23 assumes its left-hand position (solid lines) while cam follower 65 is in contact with either section $L_2$ or $S_2$ of cam 66, and its right-hand position (broken lines) when the roller is in contact with either sections $L_1$ or $S_1$ of the cam. Thus, during each revolution of cam 66, tape 10 is twice permitted to fall to alternate sides of tape support rod 21 for time intervals dependent upon the relative size of the arcs formed by each section of the cam.

Although the principles of the present invention are not so limited, it may be advantageous to maintain the angular degree of sector $L_1$ equal to that of sector $L_2$ and also the degrees of sectors $S_1$, and $S_2$ equal in order to balance each fold of tape 10 over support rod 21. Stated another way, if each fold of tape 10 is formed to hang an equal distance downward from the support on each side of the support rod, the weight of the entire length of the tape draped over the rod will be balanced and have little tendency to slip to one side or the other of the rod. The two folding levels $F_2$ and $F_3$ of Fig. 1 are produced by making the arc of section $L_1$ equal to that of section $L_2$ and the arc of sections $S_1$ and $S_2$ equal, where the angles subtending sections $L_1$ and $L_2$ are in excess of the angles subtending sections $S_1$ and $S_2$.

It is apparent that the number of folding levels of the tape draped over support rod 21 of Fig. 1 may be completely controlled by the design of rotating cam 66 of Fig. 3. For example, four folding levels may be obtained by dividing cam 66 into four pairs, each pair having equal angle sectors, wherein the angle of the sectors of each pair differs from the angle of the sectors of any of the other pairs and wherein each pair includes a sector of the first radius and a sector of the second radius.

From the foregoing description it will now be apparent that the present invention provides a rapid access tape storage system having a low inertia and completely eliminating any tendency to crease the tape. In addition, it has been demonstrated that the tape storage system of the present invention has a high volumetric efficiency and is capable of readily storing extremely long sections of tape in a small area.

In actual practice, embodiments of the present invention have been utilized for storing a magnetic tape of 7,500 feet in length for use in conjunction with a tape drive mechanism for accelerating the tape from rest to velocities of 200 inches per second within an acceleration period of eight-tenths of one millisecond. It is apparent that a storage system of these qualifications is highly satisfactory for operation with high speed digital computers.

What is claimed as new is:

1. In tape handling apparatus for information bearing tape including a first continuously rotating cylindrical drive member, a second continuously rotating cylindrical jam member positioned adjacent said first drive member for frictional driving contact iwth said first drive member whereby to receive tape loosely therebetween, a support rod for receiving tape to be stored thereon positioned adjacent said first and second members, pivoted guide means yieldably positioned on one side of said rod and intermediate said rod and said first and second drive and jam members, means for placing said jam member into driving contact with the associated drive member for driving tape in the direction of rotation of said drive member, and electrical control means selectively energizable for swinging said guide means to another side of said rod and allowing same to return to said one side upon de-energization thereof, whereby the driven tape is draped in freely hanging folds over said rod in response to the swinging of said guide means.

2. In tape handling apparatus for information bearing tape including a first continuously rotating cylindrical drive member, a first continuously rotating cylindrical jam member positioned adjacent said first drive member for frictional driving contact with said first drive member whereby to receive and pass tape loosely therebetween, a second continuously rotating cylindrical drive member spaced from said first drive member and rotating in an opposite direction from said first member, a second continuously rotating cylindrical jam member positioned adjacent said second drive member for frictional driving contact with said second drive member for driving tape loosely passing through said first drive member and first jam member and for passing tape loosely therebetween to the latter-mentioned members, a transducer positioned intermediate said first and second drive rollers and operative when said tape passes by same, support rods for receiving tape to be stored thereon positioned adjacent each of said first and second drive and jam members, pivoted guide means yieldably positioned, on one side of each of said rods and intermediate said rods and said first and second drive and jam members, means for placing one of said jam members into driving contact with the associated drive member for driving tape in the direction of rotation of said drive member, and electrical control means selectively energizable for swinging said guide means associated with the mentioned driving drive member to another side of said rod and allowing same to return to said one side upon de-energization thereof, whereby the driven tape is draped in freely hanging folds over said rod in response to the swinging of said guide means.

3. In tape handling apparatus for information bearing tape including a first continuously rotating cylindrical drive member, a first continuously rotating cylindrical jam member positioned adjacent said first drive member for frictional driving contact with said first drive member whereby to receive and pass tape loosely therebetween, a second continuously rotating cylindrical drive member spaced from said first drive member and rotating in an opposite direction from said first member, a second continuously rotating cylindrical jam member positioned adjacent said second drive member for frictional driving contact with said second drive member for driving tape loosely passing through said first drive member and first jam member and for passing tape loosely therebetween to the latter-mentioned members, a transducer positioned intermediate said first and second drive rollers and operative when said tape passes by same, support rods for receiving tape to be stored thereon positioned adjacent each of said first and second drive and jam members, pivoted guide means yieldably positioned, on one side of each of said rods and intermediate said rods and said first and second drive and jam members, means for placing one of said jam members into driving contact with the associated drive member for driving tape in the direction of rotation of said drive member, and electro-mechanical control means including camming means for swinging said guide means associated with the mentioned driving drive member to another side of said rod and allowing same to return to said one side upon de-energization thereof, whereby the driven tape is draped in freely hanging folds over said rod in response to the swinging of said guide means.

4. In tape handling apparatus as defined in claim 3 wherein the tape is magnetic tape and said guide means comprises a pivoted plate having a pair of guide members integral therewith and defined to receive and pass magnetic tape therethrough.

5. A magnetic tape storage system for receiving and storing tape discharged by an associated tape drive mechanism and for permitting tape previously stored to be withdrawn by the tape drive mechanism, said storage system comprising: a tape support rod; tape guiding means positioned along the direction of movement of the tape between said support rod and the tape drive mechanism for receiving the tape as it is discharged by the drive mechanism and for directing the tape towards said support rod, said tape guiding means including a pivot pin and a guide plate swingable about said pin for directing the tape on either side of said support rod, said guide plate having a pair of parallel guides on one face thereof between which the tape passes as the tape is discharged from and withdrawn by the tape drive mechanism, said tape guiding means further including an anchored spring connected to said guide plate to urge it in a first direction about its pivotal axis, and a fold control coupled to said guiding means for swinging said guiding means to cyclically direct the tape alternately over one side and then over the other side of said support rod causing the tape to be draped in freely hanging folds over said support rod, said fold control including a selectively energizable electromagnetic solenoid, said solenoid being linked to said guide plate to urge it in a second direction about its pivotal axis when said solenoid is energized, said fold control further including a source of voltage, a pair of contact members and a rotatable cam; said solenoid, said source and said contact members being connected in a closed loop whereby said solenoid is energized upon closure of said contact members, said contact members being mechanically coupled to said rotatable cam to cause said contact members to be opened and closed, respectively, at least once for each revolution of said cam.

6. In a tape recording and reproducing apparatus of the type having a tape drive mechanism for accelerating a recording tape from rest to a constant velocity past a transducer in a forward or a reverse direction, a tape storage system for storing the tape as it is discharged by the drive mechanism in either the forward or the reverse direction; said storage system comprising: a forward tape storage unit for storing the tape discharged by the tape drive mechanism in the forward direction, said forward unit including a forward tape support rod and a forward fold device for receiving the tape as it is discharged by the drive mechanism and for successively guiding the tape over alternate side of said forward support rod for predetermined time intervals to cause the tape to be draped in freely-hanging folds of predetermined lengths over said forward support rod, said forward fold device having a forward guide plate positionable into a first position for guiding the tape to one side of said support and positionable into a second position for guiding the tape to the opposite sides of said support, and said forward fold device further having a forward fold control coupled to said forward guide plate for successively positioning said plate in its two positions; and a reverse tape storage unit for storing the tape discharged by the tape drive mechanism in the reverse direction, said reverse unit including a reverse tape support rod and a reverse fold device for receiving the tape as it is discharged by the drive mechanism and for successively guiding the tape over alternate sides of said reverse support rod for predetermined time intervals to cause the tape to be draped in freely-hanging folds of predetermined lengths over said reverse support rod, said reverse fold device having a reverse guide plate positionable into a first position for guiding the tape to one side of said support and positionable into a second position for guiding the tape to the opposite side of said support rod, and said reverse fold device further having a reverse fold control coupled to said reverse guide plate for successively positioning said plate in its two positions.

References Cited in the file of this patent

UNITED STATES PATENTS

| | | |
|---|---|---|
| 1,624,060 | Nanterme | Apr. 12, 1927 |
| 1,827,160 | Nanterme | Oct. 13, 1931 |
| 1,856,972 | Sherman et al. | May 3, 1932 |
| 2,458,544 | Watson | Jan. 11, 1949 |

FOREIGN PATENTS

| | | |
|---|---|---|
| 60,327 | France | Nov. 2, 1954 |